United States Patent
Porteous et al.

(10) Patent No.: US 9,280,749 B1
(45) Date of Patent: Mar. 8, 2016

(54) DETERMINING AN ATTRIBUTE OF AN ONLINE USER USING USER DEVICE DATA

(71) Applicant: GOOGLE INC., Mountain View, CA (US)

(72) Inventors: Ian Porteous, Mercer Island, WA (US); Ruoyun Huang, Kirland, WA (US); Arthur Asuncion, Bothell, WA (US); Rong Ge, Sammamish, WA (US); Yong Sheng, Kirland, WA (US); Jonathan Michael Krafcik, Mercer Island, WA (US); Xintian Yang, Sammamish, WA (US); Pei Yin, San Mateo, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/048,982

(22) Filed: Oct. 8, 2013

(51) Int. Cl.
 *G06F 15/18* (2006.01)
 *G06N 99/00* (2010.01)

(52) U.S. Cl.
 CPC .................................. *G06N 99/005* (2013.01)

(58) Field of Classification Search
 USPC ............................................................ 706/12
 See application file for complete search history.

(56) References Cited

U.S. PATENT DOCUMENTS

| | | | | |
|---|---|---|---|---|
| 5,991,735 | A * | 11/1999 | Gerace | G06Q 30/02 705/7.29 |
| 8,346,710 | B2 * | 1/2013 | Chan | G06Q 30/02 706/52 |
| 8,832,003 | B1 * | 9/2014 | Bowers | G06F 9/50 706/12 |
| 8,849,804 | B1 * | 9/2014 | Law | G06F 7/00 707/722 |
| 2002/0111172 | A1 * | 8/2002 | DeWolf | G06Q 30/02 455/456.3 |
| 2009/0187520 | A1 | 7/2009 | Liu et al. | |
| 2011/0099045 | A1 | 4/2011 | Carr et al. | |
| 2011/0191282 | A1 * | 8/2011 | Chan | G06Q 30/02 706/52 |
| 2012/0053991 | A1 | 3/2012 | Shimizu et al. | |
| 2013/0254771 | A1 * | 9/2013 | Musayev | G06F 9/466 718/101 |
| 2013/0275511 | A1 * | 10/2013 | Wilson | G06N 3/02 709/204 |
| 2014/0164369 | A1 * | 6/2014 | Nichols | G06F 17/30536 707/725 |

(Continued)

OTHER PUBLICATIONS

Cost-Effective User Monitoring for Popularity Prediction of Online User-Generated Content Mengmeng Yang; Kai Chen; Zhongchen Miao; Xiaokang Yang Data Mining Workshop (ICDMW), 2014 IEEE International Conference on Year: 2014 pp. 944-951, DOI: 10.1109/ICDMW.2014.72 Referenced in: IEEE Conference Publications.*

(Continued)

*Primary Examiner* — Michael B Holmes
(74) *Attorney, Agent, or Firm* — Foley & Lardner LLP; John D. Lanza (57) ABSTRACT

A computer-implemented method for determining an attribute for an online user of a candidate computing device is provided. The method implemented uses a host computing device. The method includes identifying a first set of model data including device data from a plurality of model computing devices including location data and access data, and a plurality of categories for an attribute of a population segment including an online user. Each category defines a segment of the attribute. The method further includes training a classification model by the host computing device with at least the first set of model data and the plurality of categories. The method also includes identifying device data associated with the candidate computing device. The method further includes applying the device data of the candidate computing device to the classification model to determine a category of the plurality of categories for the online user.

24 Claims, 7 Drawing Sheets

(56) References Cited

U.S. PATENT DOCUMENTS

2015/0066593 A1* 3/2015 Huang .............. G06Q 30/0202
                                                    705/7.31
2015/0066630 A1* 3/2015 Ge .................... G06Q 30/0244
                                                    705/14.43

OTHER PUBLICATIONS

Foresee (4C): Wireless link prediction using link features Tao Liu; Cerpa, A.E. Information Processing in Sensor Networks (IPSN), 2011 10th International Conference on Year: 2011 pp. 294-305 Referenced in: IEEE Conference Publications.*

Online adaptive status prediction strategy for data-driven fault prognostics of complex systems Liu Datong; Peng Yu; Xiyuan, P. Prognostics and System Health Management Conference (PHM-Shenzhen), 2011 Year: 2011 pp. 1-6, DOI: 10.1109/PHM.2011.5939530 Referenced in: IEEE Conference Publications.*

Research on the prediction system of cutting tool life Zhigang Wang; Zhenhua Wu; Leida Xu; Chiming Li Measurement, Information and Control (ICMIC), 2013 International Conference on Year: 2013, vol. 02 pp. 1416-1419, DOI: 10.1109/MIC.2013.6758224 Referenced in: IEEE Conference Publications.*

* cited by examiner

DETERMINING AN ATTRIBUTE OF AN ONLINE USER USING USER DEVICE DATA

BACKGROUND

This specification relates to determining an attribute of an online user using user device data and, more particularly, to methods and systems for determining an attribute of an online user using user device data including geographic location data and/or historical access data associated with the user device, wherein the determined attribute can then be used for delivering more relevant online content to the online user.

A content item, such as an advertisement, may be displayed on a user computing device along with text in a webpage or other online publication. The content item may be displayed because it is pertinent to the publication or because it may otherwise be of interest to a user viewing the publication. Providers of online content, such as advertisers, prefer to provide online content items that are relevant to the online users. In some cases, providers of online content items try to obtain demographic information about online users from said online users so that relevant online content can be served to them. However, in many cases, such demographic information is not provided.

BRIEF DESCRIPTION OF THE DISCLOSURE

In one aspect, a computer-implemented method for determining an attribute for an online user of a candidate computing device is provided. The method implemented uses a host computing device. The method includes identifying, by the host computing device, a first set of model data including device data from a plurality of model computing devices. The model data includes location data and access data. The method also includes identifying a plurality of categories for an attribute of a population segment. Each category defines a segment of the attribute. The online user is a member of the population segment. The method further includes training a classification model by the host computing device with at least the first set of model data and the plurality of categories. The method also includes identifying device data associated with the candidate computing device. The method further includes applying the device data of the candidate computing device to the classification model to determine a category of the plurality of categories for the online user.

In another aspect, a computer system is provided. The computer system includes at least one processor and at least one memory comprising computer-executable instructions that, when executed by said at least one processor, cause said at least one processor to identify a first set of model data including device data from a plurality of model computing devices. The model data includes location data and access data. The computer-executable instructions also cause the processor to identify a plurality of categories for an attribute of a population segment. Each category defines a segment of the attribute. An online user is a member of the population segment. The computer-executable instructions further cause the processor to train a classification model with at least the first set of model data and the plurality of categories. The computer-executable instructions also cause the processor to identify device data associated with a candidate computing device of the online user. The computer-executable instructions further cause the processor to apply the device data to the classification model to determine a category of the plurality of categories for associating with the online user of the candidate computing device.

In yet another aspect, computer-readable storage media having computer-executable instructions embodied thereon are provided. When executed by at least one processor, the computer-executable instructions cause the processor to identify a first set of model data including device data from a plurality of model computing devices. The model data includes location data and access data. The computer-executable instructions also cause the processor to identify a plurality of categories for an attribute of a population segment. Each category defines a segment of the attribute. An online user is a member of the population segment. The computer-executable instructions further cause the processor to train a classification model by the processor with at least the first set of model data and the plurality of categories. The computer-executable instructions also cause the processor to identify device data associated with a candidate computing device for the online user. The computer-executable instructions further cause the processor to apply the device data to the classification model to determine a category of the plurality of categories for associating with the online user of the candidate computing device.

BRIEF DESCRIPTION OF THE DRAWINGS

FIGS. 1-8 show exemplary embodiments of the methods and systems described herein.

Like reference numbers and designations in the various drawings indicate like elements.

DETAILED DESCRIPTION OF THE DISCLOSURE

Embodiments of the methods and systems described herein enable a content management system (CMS) to infer an attribute of an online user from user device data and, more specifically, categorize the online user in relation to the attribute. The CMS is configured to build, or "train," a model using historical user device data from many computer devices and use that model to categorize a user of another "candidate" computer device. For example, the system may be used to infer an education level or household income level (i.e., an "attribute") for a particular online user associated with the candidate user device based on historical user device data from other computer devices and other online users.

During a model build phase, the CMS builds a model using both a body of historical device data from many computer devices (also referred to herein as "model data" or "training data") as well as a table of categories for an attribute. The body of historical device data, in some embodiments, includes geo-location data about the many computer devices, as well as other "features" of the computer devices such as, for example, what web sites the computer device has visited, or what ads the computer device has viewed (also referred to herein as "access data"). The table of attribute categories, in some embodiments, includes demographic categories for many geo-locations, as well as known or "trusted" values for those categories within each particular geo-location. Each category within a geo-location identifies a segment in relation to the attribute. For example, presume the attribute is "household income." The table may categorize online users and user devices by "less than $50,000", "less than $100,000", and "greater than $100,000." And for each geo-location, such as zip code, the table also includes a known distributional value for each category, such as a known percentage of the population segment within that zip code that falls into each category. For another example, presume the attribute is "education level". The table may categorize online users by "non-high-school graduate", "high-school graduate", and "college graduate". And for each geo-location, such as at a zip code level of granularity, the table also includes a known value for each category within each zip code, such as that a particular zip code has 20% non-high-school graduates, 35% high-school graduates, and 45% college graduates. In other words, the table serves as a template for how the historical data is used to build the model.

The model is taught using the historical device data (i.e., the geo-location and access data) from the many computer devices. In some embodiments, a logistical function is trained using the historical device data until the model conforms to the categorization values given in the table. Once taught using this model input data (e.g., historical user device data and categorization table values), the model can then be used to categorize other computer devices based on some of the same features.

During an analysis phase, the system analyzes another computer device (i.e., the candidate computer device). More specifically, access data is collected from the candidate computer device, and the CMS applies that feature data to the model. The model generates a category for the candidate computer device, which represents an approximation of the attribute for an online user of the candidate computer device (i.e., an estimation of which category the candidate computer device falls into). As such, the categorization of the candidate computer device can help the CMS to present more relevant content to the online user.

The following detailed description illustrates embodiments of the disclosure by way of example and not by way of limitation. It is contemplated that the disclosure has general application to processing web traffic regardless of the type of webserver, how the traffic reaches the webserver, and/or the type of content provided by the webserver.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) identifying, by a host computing device, a first set of model data including device data from a plurality of model computing devices, model data including location data and access data; (b) identifying a plurality of categories for an attribute of a population segment, each category defining a segment of the attribute, the online user being a member of the population segment; (c) training a classification model by the host computing device with at least the first set of model data and the plurality of categories; (d) identifying device data associated with the candidate computing device; (e) applying the device data of the candidate computing device to the classification model to determine a category of the plurality of categories for the online user; (f) serving content to the online user at the candidate computing device, wherein the content is selected based at least in part on the determined category; (g) training a classification model including a logistic function; (h) identifying a plurality of categories wherein the attribute of the population segment is at least one of household income and education level; (i) identifying a plurality of categories including at least one of ranges of household income and various education levels; (j) identifying a first set of model data including location data, wherein location data includes one or more of city, state, and zip code associated with the plurality of model computing devices; (k) identifying device data including internet activity data associated with the candidate computing device; and (l) identifying device data including location data associated with the candidate computing device.

Figure 1:
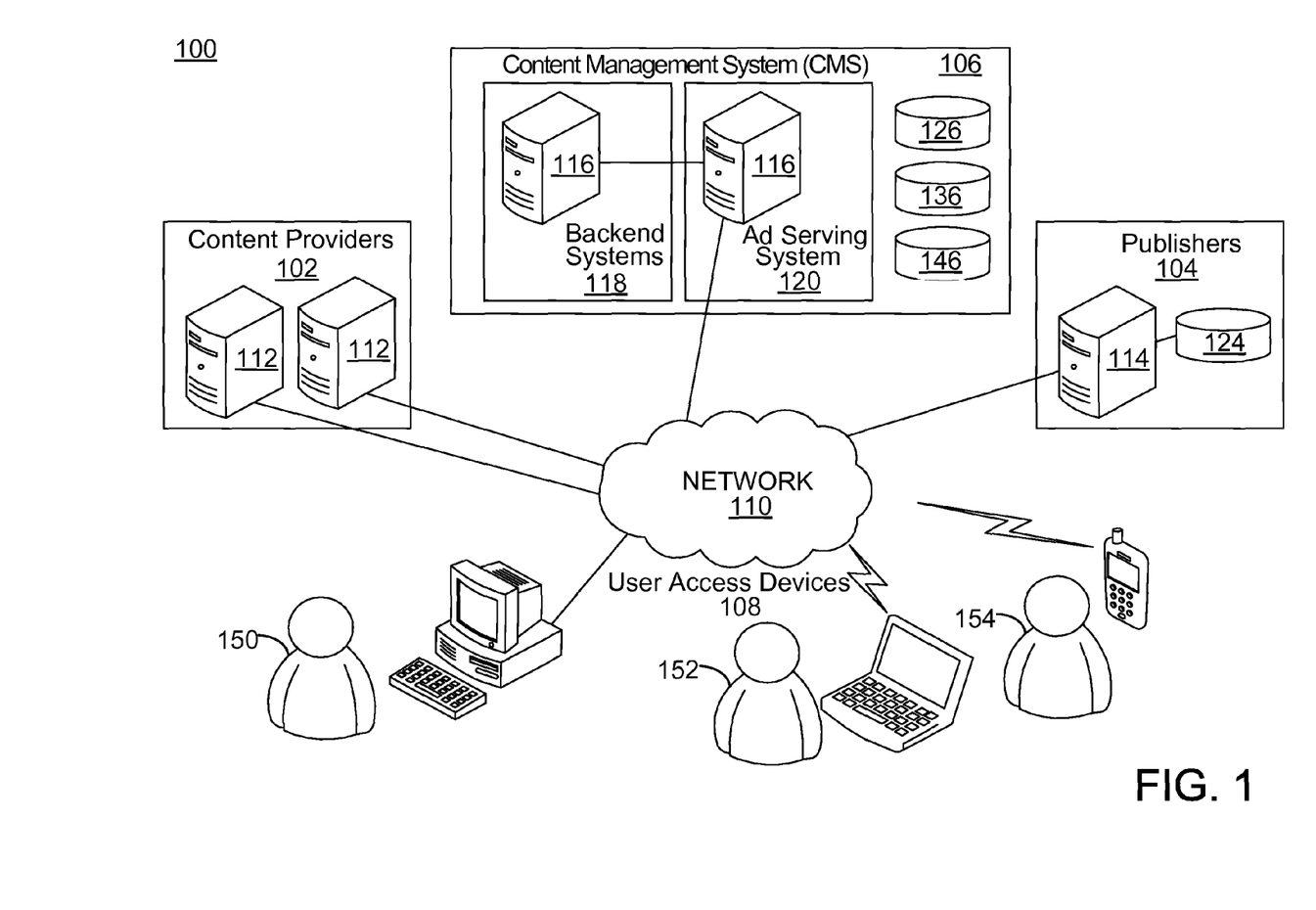
FIG. 1 is a diagram of an example networked environment for determining an attribute of an online user using user device data.

FIG. 1 is a diagram depicting an example networked environment for determining an attribute of an online user using user device data. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 (e.g., advertisers) may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based, mobile application-based, and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or front-end modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget. Further, in some embodiments, the CMS 106 may allow the content providers 102 to customize content relative to features such as household income or education level.

The CMS 106 may also allow the content providers 102 to view information about content impressions, which may be maintained by the CMS 106. The CMS 106 may be configured to determine and maintain the number of content impressions relative to a particular website, keyword, or feature, such as education level or household income level. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
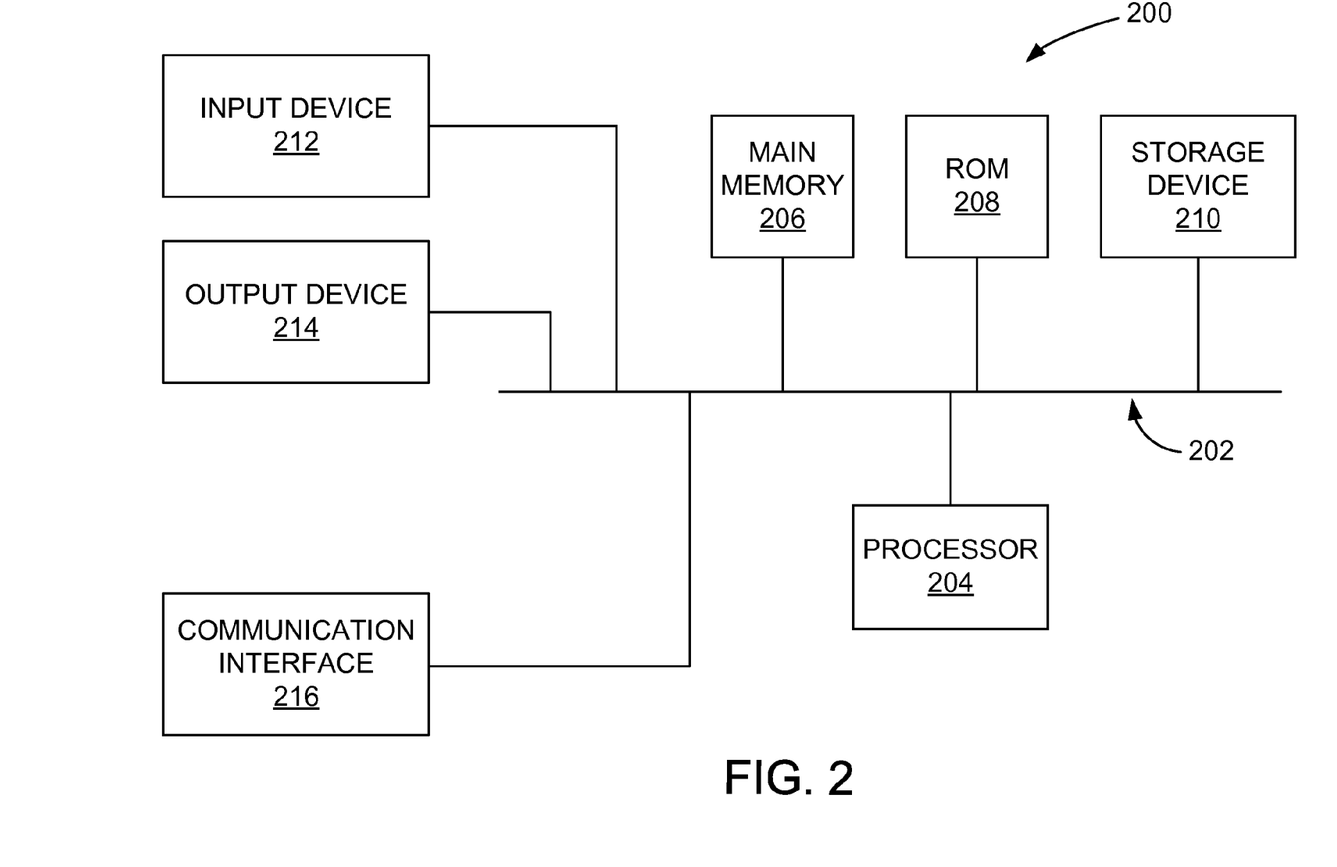
FIG. 2 is a block diagram of a computing device used for identifying relationships between online content items as shown in the advertising environment of FIG. 1.

FIG. 2 is a block diagram of a computing device 200 used for categorizing online user devices, such as the various computing devices in advertising environment 100 (shown in FIG. 1). More specifically, computing device 200 is configured to determine a pre-selected attribute of an online user using user device data including geo-location data and/or feature data (access data) associated with the user's computing device (the candidate device). FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is configured to receive and/or retrieve electronic documents from various other computing devices connected to computing device 200 through a communication network, and store these electronic documents within at least one of memory 206, storage device 210, and ROM 208. Computing device 200 is further configured to manage and organize these electronic documents within at least one of memory 206, storage device 210, and ROM 208 using the techniques described herein.

Figure 3:
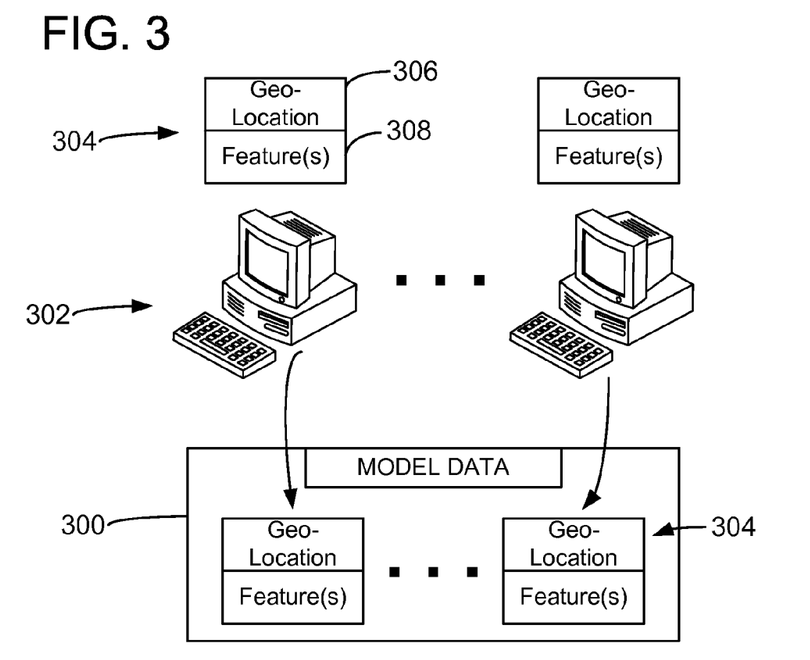
FIG. 3 is a data flow diagram of an example set of model data for determining an attribute of an online user in the advertisement environment of FIG. 1 using the computing device in FIG. 2.

FIG. 3 is a data flow diagram of an example set of model data 300 for determining an attribute of an online user in the advertisement environment of FIG. 1 using computing device 200 (shown in FIG. 2). In the example embodiment, model data 300 (i.e., historical device data) is collected from a plurality of computer devices 302 associated with a plurality of online users. In some embodiments, computer devices 302 are similar to user access devices 108 (shown in FIG. 1). Each computer device 302, in the example embodiment, includes user device data 304 that includes geo-location data 306 and feature data 308 (i.e., access data) associated with the computer device 302, described in greater detail below.

Geo-location data 306, in the example embodiment, includes data related to a general physical location of computer devices 302, such as a geographical region. For example, in some embodiments, geo-location data 306 includes U.S. postal zip code, country, state, and/or city, and may be used individually and/or in combination. Further, geo-location data 306, in some embodiments, is not direct (i.e., first order) information defining the geo-location of the computer device 302. Rather, geo-location data 306 may include information that is used to identify geographic location information (i.e., second-order information or greater). For example, in some embodiments, computer device 302 includes an associated Internet Protocol (IP) address which may be used to infer a general geographical region associated with computer devices 302. In the example embodiment, geo-location data is one specific example of a categorical grouping associated with the attribute. However, it should be understood that the systems and methods described herein may be used with other attributes and categorical groupings such as, for example, device brand (i.e., the type of computing device), or the specific applications installed in on the computing device. In some embodiments, such data may be combined with statistics for each grouping such as, for example, household income distribution for certain device types, or age distribution for users of a particular application. The systems and methods described herein use population segments to categorize an attribute associated with a user device, and therefore only need broad geo-location data (e.g., zip code) of the user devices for this categorization. Further, the systems and methods described herein predict a categorization of particular computing devices relative to an attribute, and do not require access to personal information for individual users for that attribute.

Feature data 308, in the example embodiment, includes data associated with computer devices 302. In some embodiments, feature data 308 is access data associated with computer devices 302, such as data indicating which particular advertisements were viewed on computer device 302 (i.e., impressions served), and from which web pages those advertisements were served, which videos were viewed by computer device 302, the locations and/or times that a particular advertisement was viewed on computer device 302, device information associated with computer device 302, or what web sites were accessed by computer device 302.

During operation, device data 304 for a plurality of computer devices 302 are collected and used as model data 300 to teach a model used to categorize a candidate computer device (not shown in FIG. 3). In some embodiments, model data 300 may be collected and/or stored by CMS 106 (shown in FIG. 1). For example, CMS 106 may collect site-visit data for a plurality of user access devices 108 (shown in FIG. 1) (i.e., computer devices 302) using HTTP cookies. CMS 106 may then select 30 days of site-visit data to use as model data 300 for building a model. Model building and use is described in greater detail below.

Figure 4:
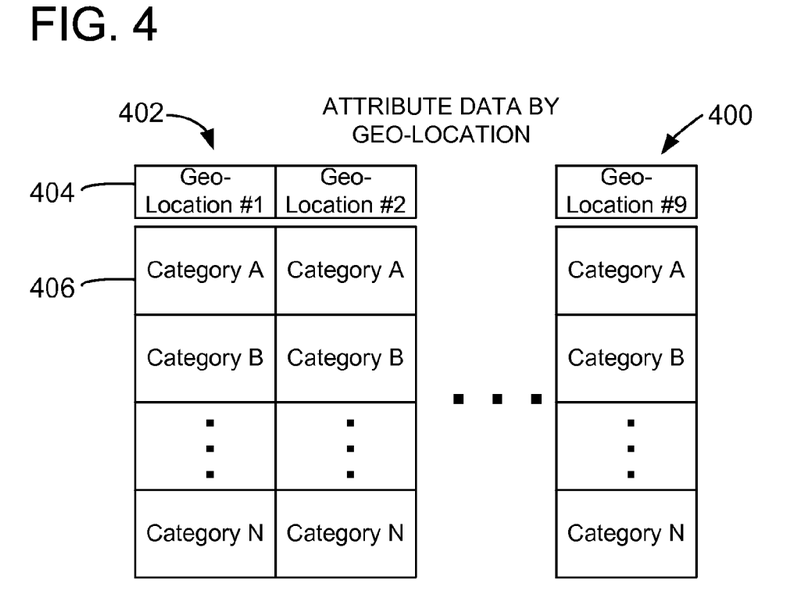
FIG. 4 is an example table of data for categorizing user computing devices according to a particular attribute, trait, or behavioral pattern.

FIG. 4 is an example table 400 of data for categorizing computer devices according to a particular attribute, trait, or behavioral pattern (generally referred to herein as an "attribute"). Table 400 includes columns 402, each column 402 representing, in the example embodiment, an attribute's categorization for a single geo-location 404. Each column 402 includes a geo-location 404, as well as several categories 406, such as Category's "A" to "N." For another example, table 400 may represent an attribute such as education level or house-hold income. As such, a single column, such as the "Geo-Location #1" column, presents categorizations of education level or household income for the single geo-location #1. Category "A" may represent "high-school educated," Category "B" may represent "college educated," and there may be categories for "trade-school educated" or "legally educated" or "doctoral educated," each of which represent some categorization related to the attribute. Or Category "A" may represent "less than $50,000", Category "B" may represent "less than $100,000", and so on.

Each category 406, in the example embodiment, also has an associated value (not shown) representing a distribution percentage expressing how much of the population within a given population segment (i.e., people living in the particular geo-location 404) match the particular category's description. For example, if "geo-location #1" is based on the U.S. zip code "12345," and Category "A" description is "high-school educated," then a value for Category "A" of "87%" indicates that 87% of people living within zip code "12345" have at least high school-level education. Similarly, the same geo-location may have a value for Category "B" of "45%," indicating that 45% of people living within zip code "12345" have at least a college-level education. For another example, using the household income categories described above, Category "A" may be 60%, indicating that 60% of people living within zip code "12345" have an annual household income of less than $50,000. Category "B" may be 35%, indicating that 35% of people living within zip code "12345" have an annual household income of less than $100,000.

In some embodiments, values for each category 406 within each geo-location 404 are obtained from reliable sources, such as publicly available U.S. census data or IRS data. Alternatively, any source of such information may be used. Further, in some embodiments, the set of categories 406 within a single column 402 may represent overlapping ranges (i.e., a person may belong to multiple categories) or may represent non-overlapping, exclusive ranges (i.e., a person may only belong to one category). For example, a person with a college level of education also (presumably) has a high school education, and thus would be categorized into at least those two categories. As another example, presume house-hold income (HHI) is used, and each category represents a non-overlapping range of income, such as "greater than $50,000" and "less than $50,000." This is an example of a set of two categories that do not overlap, and thus a person would only belong to one or the other. Such information is generalized by segmenting a population segment into categories, and thus does not require tethering any individual's model data 300 (shown in FIG. 3) to that particular individual, nor specific knowledge of any particular model individual's categorization.

During operation, table 400 data is populated with trusted values, and a model is built with this data using the model data 300 described above in reference to FIG. 3 in a process described in greater detail below.

Figure 5:
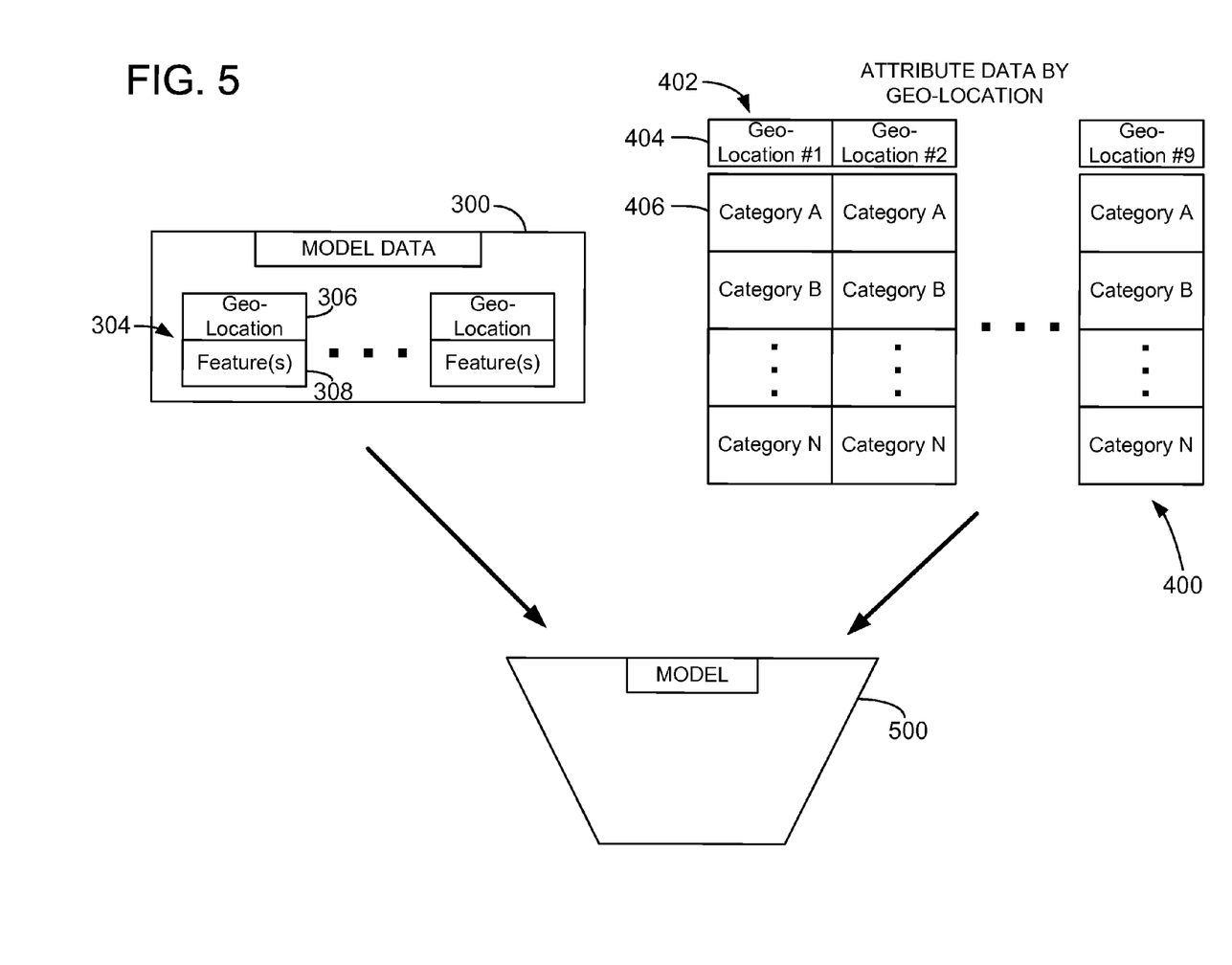
FIG. 5 is a data flow diagram illustrating the data inputs shown in FIG. 4 that are used to create a model for determining an attribute of an online user as shown in FIGS. 3 and 4.

FIG. 5 is a data flow diagram illustrating the data inputs shown in FIG. 4 that are used to create a model 500 for determining an attribute of an online user as shown in FIGS. 3 and 4. In the example embodiment, model data 300 and table 400 data are used to construct model 500. More specifically, model 500 is built using a logistic function, where the model data 300 acts as the "input vector" and the geo-location categories and values of table 400 act as "answer vector." The example embodiment operates on generalized distribution data for particular geo-locations (i.e., table 400) and a body of historical data (i.e., model data 300), and thus do not require identifying particular individuals with their model data.

For example, presume $G_z$ refers to all the cookies for zip code z, and $X_i$ is a vector of binary features for cookie 1. A logistic function is:

$$F(X_i; B) = \frac{1}{(1 + e^{(-X_i B)})}$$

Presume also that $T_z$ is the true stats for zip code z (e.g., 80% are "HHI>$100,000"). B is a vector of beta's (i.e., what is being learned). $B_i$,t is the beta for the $i^{th}$ feature during the $t^{th}$ iteration of the algorithm. Until the error stops decreasing, the following is performed:

```
For all zip codes z
    for all X_i in G_z
        S_z = sum F(X_i;B).
        Delta is the difference between S_z and T_z.
        For each B_j, update B_j,t+1 = B_j,t + epsilon * B_j * Delta
```

In the example embodiment, epsilon is the learning rate. Because the data is large, the update for each zip code is calculated (i.e., $B_j$, t+1, z).

Figure 6:
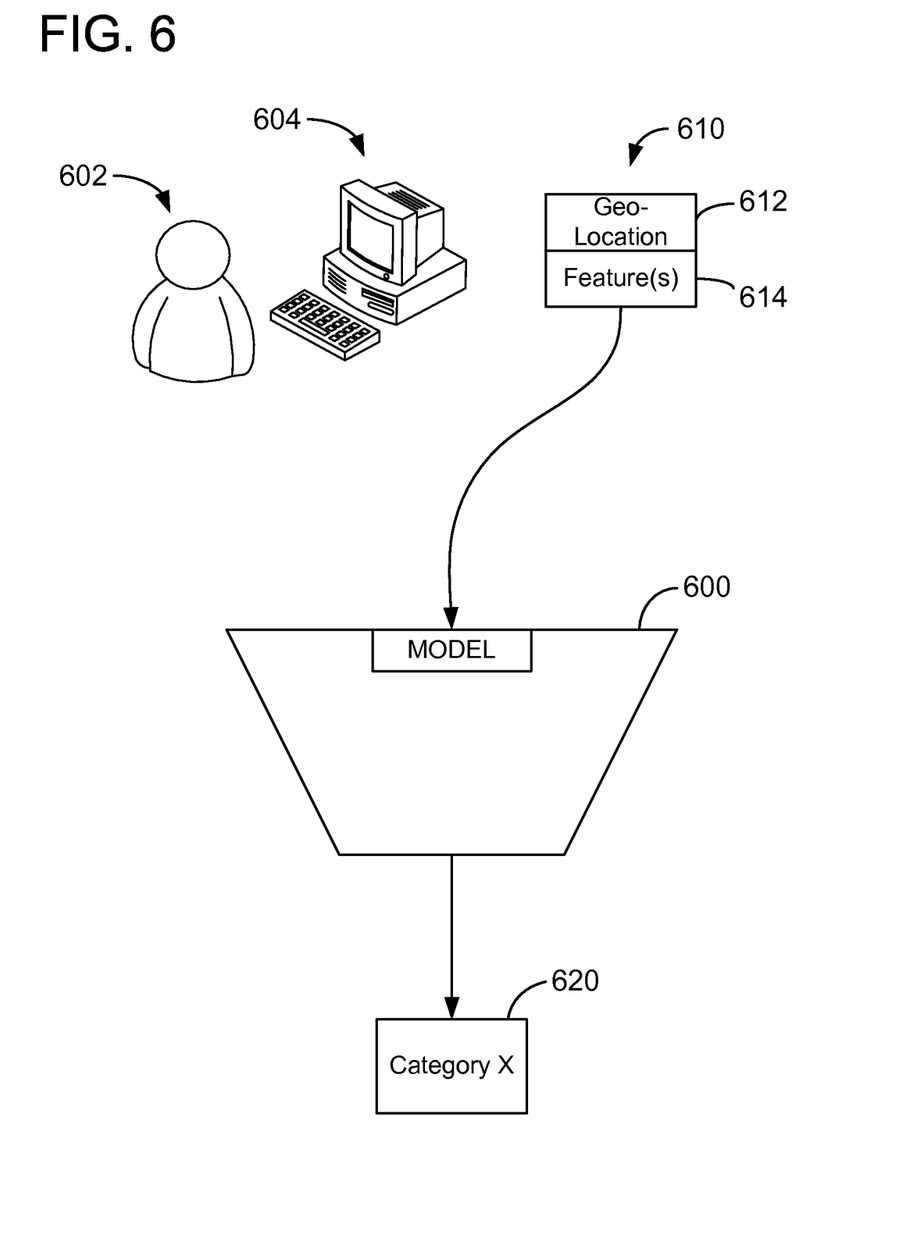
FIG. 6 is a data flow diagram illustrating the use of the model shown in FIG. 5 for determining an attribute of an online user of a computing device shown in FIGS. 1 and 2.

FIG. 6 is a data flow diagram illustrating the use of a model 600 to determine an attribute of an online user 602 of a computing device 604. In some embodiments, computing device 604 is similar to user access devices 108 (shown in FIG. 1) and model 600 is similar to model 500 (shown in FIG. 5). Computing device 604 includes device-specific data 610 such as geo-location data 612 and features data 614. In some embodiments, device-specific data 610 is similar to device-specific data 304 (shown in FIG. 3).

In some embodiments, computing device 604 includes a cookie uniquely identifying computing device 604, along with associated geo-location data 612 and features data 614. CMS 106 may run an "offline prediction" based on geo-location data 612 and/or features data 614 using model 500. For example, CMS 106 may have stored a history of features data 614 and/or geo-location data 612 for computing device 604, and may compute the offline prediction using this historical data. As such, the offline prediction represents a guess as to categorization of computing device 604 using model 500 based only on historical data.

In other embodiments, CMS 106 may run an "online prediction" based on geo-location data 612 and features data 614 at runtime (i.e., while user 602 is operating computing device 604, such as while running search queries or shopping on the Internet). The online prediction uses present geo-location data 612 and features data 614 to generate a categorization prediction based on more current information (i.e., because, for example, computing device 604 may be in a different geographic location than the historical data would have predicted). The online prediction represents a guess as to categorization of computing device 604 based on present information. Further, in some embodiments, CMS 106 may combine or aggregate the offline prediction and the online prediction to generate a composite prediction. For example, the offline prediction may be weighted by a value A, and the online prediction may be weighted by a value B. The two predictions are then combined and compared against a predetermined threshold to determine a categorization estimate for computing device 604.

It should be understood that, in either the offline prediction or the online prediction, geo-location data associated with computing device 604 need not be any more granular than the geo-location categorization 404 used in table 400 (shown in FIG. 4). The present geo-location data 612, like the geo-location data used with model data 300 (shown in FIG. 3), is generalized to a geo-location category 404 (shown in FIG. 4). A more precise geo-location of computing device 604 is not necessary.

During operation, device-specific data 610 functions as a particular "observation" that is applied to model 500 (shown in FIG. 5) and/or to model 600 to produce a categorization result 620 or "categorical outcome." In some embodiments, categorization result 620 is an offline prediction, as described above. In other embodiments, categorization result 620 is an online prediction, as described above. In still other embodiments, categorization result 620 is a composite prediction, as described above. For example, user 602 may browse a web site containing an ad (i.e., a content item). The ad serving system, such as CMS 106, receives device-specific data 610 from the user's computing device 604 that includes an IP address for computing device 604, or some other geo-location data such as a user's zip code from a cookie. CMS 106 utilizes the IP address to map to a zip code (i.e., a present location of computing device 604 at runtime) and other feature data 614 to generate an "online prediction" using model 600. CMS 106 also gathers a cookie identifier for computer device 604 and retrieves the "offline prediction" for computing device 604 (i.e., a prediction using historical information). CMS 106 then combines the offline prediction and the online prediction to generate categorization result 620 for computing device 604. CMS 106 then uses categorization result 620 to deliver more category-appropriate content to consumer 602.

Figure 7:
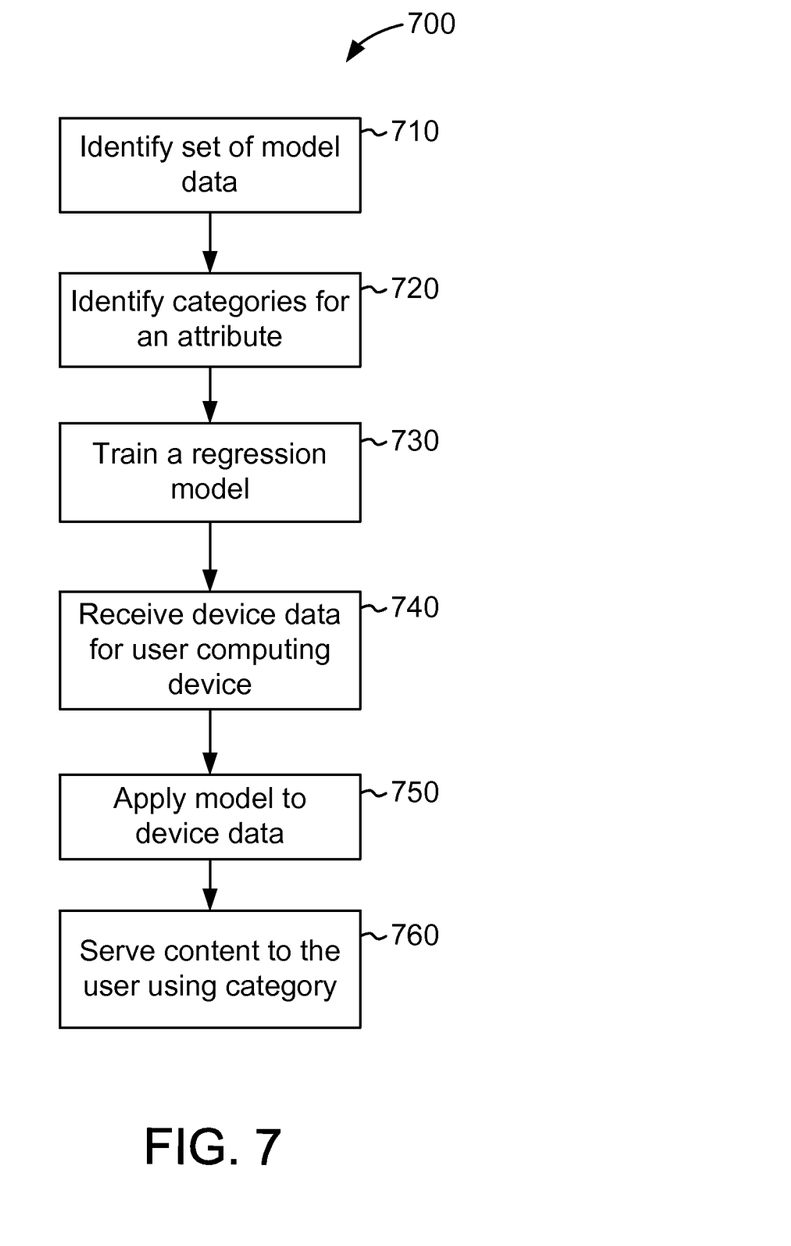
FIG. 7 is an example method for determining attributes of online users using the model and data inputs shown in FIG. 6.

FIG. 7 is an example method 700 for determining attributes of online users using model 500 (shown in FIG. 5), model 600 (shown in FIG. 6), and/or data inputs 610 (shown in FIG. 6). Method 700 uses a computing device including a processor and a memory, such as content management systems 106 (shown in FIG. 1) and/or computing device 200 (shown in FIG. 2). In the example embodiment, method 700 includes identifying a first set of model data including location data and access data such as, for example, geo-location data 306 and features data 308 (shown in FIG. 3). Method 700 also includes identifying a plurality of categories, such as illustrated in table 400 (shown in FIG. 4), for an attribute of the population segment, such as household income, where each category defines at least a portion of the attribute. Method 700 further includes training a classification model, such as model 500 (shown in FIG. 5), with at least the first set of model data and the plurality of categories. Method 700 also includes identifying device data, such as device-specific data 610, associated with a first user computing device, such as computing device 604 (shown in FIG. 6). Method 700 further includes applying the device data to the classification model to determine a category of the plurality of categories, such as category 620 (shown in FIG. 6), for the online user.

Figure 8:
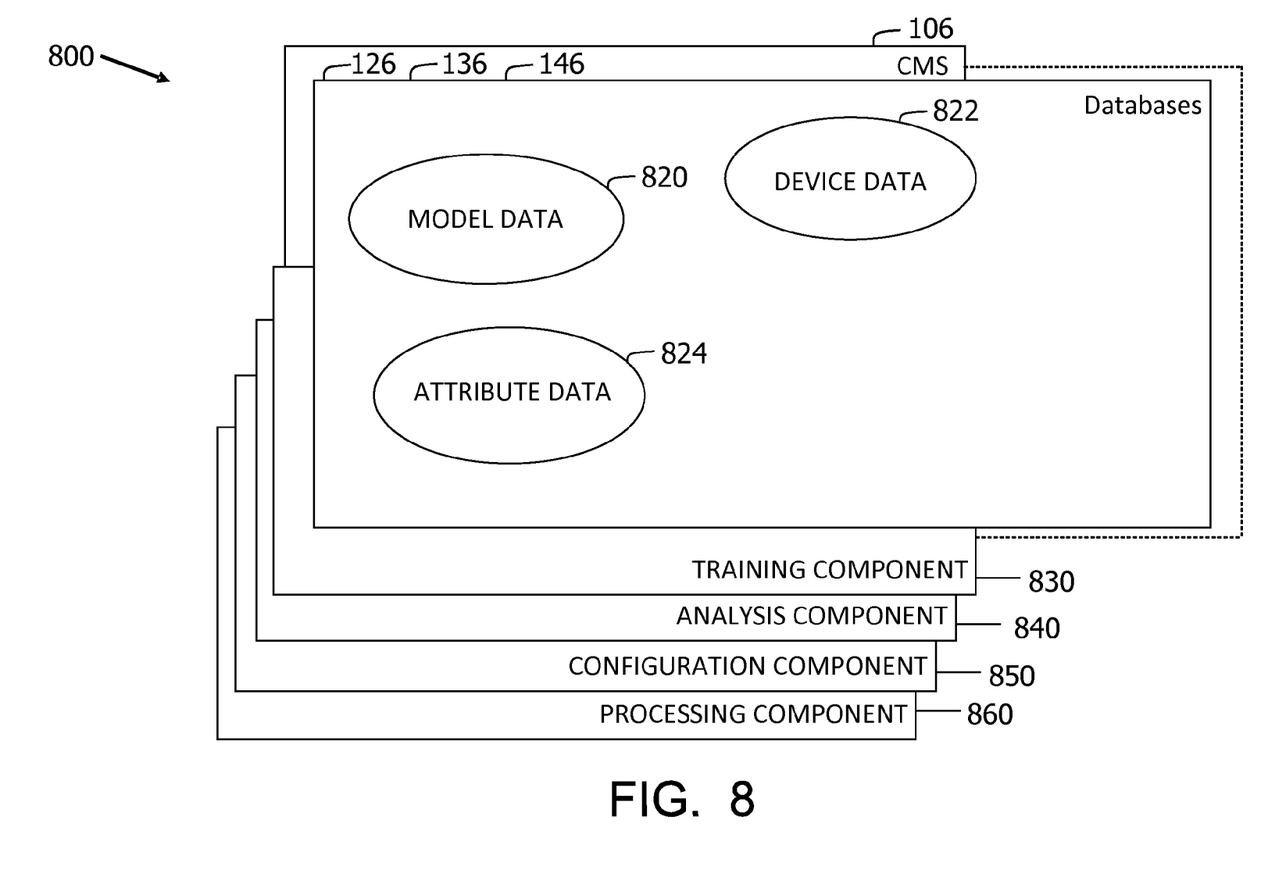
FIG. 8 is a diagram of components of one or more example computing devices that may be used in the environment shown in FIG. 1.

FIG. 8 is a diagram 800 of components of one or more example computing devices, for example computing device 200 (shown in FIG. 2), that may be used in the environment shown in FIG. 1. For example, one or more of computing devices 200 may form content management system 106, content provider system 102, and/or publisher system 104 (shown in FIG. 1). FIG. 9 further shows a configuration of databases 126, 136, and 146 (also shown in FIG. 1). Databases 126, 136, and 146 are coupled to several separate components within CMS 106, which perform specific tasks.

In an exemplary embodiment, databases 126, 136, and 146 are divided into a plurality of sections, including but not limited to, a device section 820, a model section 822, and an attribute section 824. These sections within databases 126, 136, and 146 are interconnected to retrieve information pertaining to the operations and components described below.

CMS 106 includes a training component 830 for training a model such as model 500 (shown in FIG. 5) using device data 820 such as, for example, geo-location data 306 and feature data 308 (shown in FIG. 3), and attribute data 824 such as, for example, attribute table 400. CMS 106 also includes an analysis component 840 for applying model 500 to other user and device data 820 such as, for example, device-specific data 610 (shown in FIG. 6). CMS 106 additionally includes a configuration component 850 for selecting the training data used to build model 500 and configuring attribute table 400. CMS 106 additionally includes a processing component 860 for performing other operations associated with identifying relationships between content items.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for determining an attribute for an online user of a candidate computing device, the method implemented using a host computing device, the method comprising:
   identifying, by the host computing device, a first set of model data including a first set of device data from a plurality of model computing devices, the first set of device data including location data and access data for the plurality of model computing devices;
   identifying a plurality of categories for an attribute of a population segment, each category defining a segment of the attribute, the population segment including the candidate computing device;
   training a classification model by the host computing device using the first set of model data and the plurality of categories;
   receiving a device identifier from the candidate computing device, the device identifier including device data of the candidate computing device;
   applying the device data of the candidate computing device to the classification model to generate an offline prediction of a category of the plurality of categories for the candidate computing device;
   determining a location of the candidate computing device using an IP address of the candidate computing device;
   generating an online prediction of a category of the plurality of categories for the candidate computing device using the location; and
   generating a composite prediction of a category of the plurality of categories for the candidate computing device by combining the offline prediction and the online prediction.

2. The method of claim 1, further comprising:
   receiving, at the host computing device from the candidate computing device, a request for content;
   selecting, by the host computing device, a content item based on the composite prediction; and
   serving the content item to the candidate computing device in response to the request.

3. The method of claim 1, wherein training the classification model includes building the classification model using a logistic function.

4. The method of claim 1, wherein the plurality of categories includes a plurality of non-overlapping ranges of household income.

5. The method of claim 1, wherein the plurality of categories includes a plurality of overlapping ranges of education levels.

6. The method of claim 1, wherein identifying the first set of model data further comprises:
   receiving, from the plurality of computing devices, a plurality of device identifiers; and
   extracting, from the plurality of device identifiers, access data associated with the plurality of computing devices, the access data including internet activity data of each model computing device of the plurality of model computing devices.

7. The method of claim 1, wherein the device data of the candidate computing device includes internet activity data and location data associated with the candidate computing device.

8. The method of claim 1, wherein generating the online prediction comprises retrieving, by the host computing device from a memory, a category value and distribution percentage corresponding to the location.

9. A computer system comprising:
   a processor; and
   a memory storing computer-executable instructions that, when executed by the processor, cause the processor to:
      identify a first set of model data including a first set of device data from a plurality of model computing devices, the first set of device data including location data and access data for the plurality of model computing devices;
identify a plurality of categories for an attribute of a population segment, each category defining a segment of the attribute, the population segment including the candidate computing device;
train a classification model using the first set of model data and the plurality of categories;
receive a device identifier from the candidate computing device, the device identifier including device data of the candidate computing device;
apply the device data to the classification model to generate an offline prediction of a category of the plurality of categories for the candidate computing device;
determine a location of the candidate computing device using an IP address of the candidate computing device;
generate an online prediction of a category of the plurality of categories for the candidate computing device using the location; and
generate a composite prediction of a category of the plurality of categories for the candidate computing device by combining the offline prediction and the online prediction.

10. The computer system of claim 9, the computer-executable instructions further causing the processor to:
receive, from the candidate computing device, a request for content;
select a content item based on the composite prediction; and
serve the content item to the candidate computing device in response to the request.

11. The computer system of claim 9, wherein training the classification model includes building the classification model using a logistic function.

12. The computer system of claim 9, wherein the plurality of categories includes a plurality of non-overlapping ranges of household income.

13. The computer system of claim 9, wherein the plurality of categories includes a plurality of overlapping ranges of education levels.

14. The computer system of claim 9, wherein identifying the first set of model data includes:
receiving, from the plurality of computing devices, a plurality of device identifiers; and
extracting, from the plurality of device identifiers, access data associated with the plurality of computing devices, the access data including internet activity data of each model computing device of the plurality of model computing devices.

15. The computer system of claim 9, wherein the device data of the candidate computing device includes internet activity data and location data associated with the candidate computing device.

16. The computer system of claim 9, wherein generating the online prediction comprises retrieving, by the processor from the memory, a category value and distribution percentage corresponding to the location.

17. A non-transitory, computer readable storage medium storing instructions that, when executed by a processor, cause the processor to:

identify a first set of model data including a first set of device data from a plurality of model computing devices, the first set of device data including location data and access data for the plurality of model computing devices;
identify a plurality of categories for an attribute of a population segment, each category defining a segment of the attribute, the population segment including the candidate computing device;
train a classification model using the first set of model data and the plurality of categories;
receive a device identifier from the candidate computing device, the device identifier including device data of the candidate computing device;
apply the device data to the classification model to generate an offline prediction of a category of the plurality of categories for the candidate computing device;
determine a location of the candidate computing device using an IP address of the candidate computing device;
generate an online prediction of a category of the plurality of categories for the candidate computing device using the location; and
generate a composite prediction of a category of the plurality of categories for the candidate computing device by combining the offline prediction and the online prediction.

18. The non-transitory, computer readable medium of claim 17, further comprising instructions that cause the processor to:
receive, from the candidate computing device, a request for content;
select a content item based on the composite prediction; and
serve the content item to the candidate computing device in response to the request.

19. The non-transitory, computer readable medium of claim 17, wherein training the classification model includes building the classification model using a logistic function.

20. The non-transitory, computer readable medium of claim 17, wherein the plurality of categories includes a plurality of non-overlapping ranges of household income.

21. The non-transitory, computer readable medium of claim 17, wherein the plurality of categories includes a plurality of overlapping ranges of education levels.

22. The non-transitory, computer readable medium of claim 17, wherein identifying the first set of model data includes:
receiving, from the plurality of computing devices, a plurality of device identifiers; and
extracting, from the plurality of device identifiers, access data associated with the plurality of computing devices, the access data including internet activity data of each model computing device of the plurality of model computing devices.

23. The non-transitory, computer readable medium of claim 17, wherein the device data of the candidate computing device includes internet activity data and location data associated with the candidate computing device.

24. The non-transitory, computer readable medium of claim 17, wherein generating the online prediction comprises retrieving, by the processor from a memory, a category value and distribution percentage corresponding to the location.

* * * * *